3,548,053
INTERFERON PRODUCTION
Narendra Nath Joshi, St. Laurent, Montreal, Quebec, Canada, assignor to Frank W. Horner Limited, Mount Royal, Quebec, Canada, a company of Canada
No Drawing. Filed Sept. 7, 1965, Ser. No. 485,583
Int. Cl. A61r 27/00
U.S. Cl. 424—85                    12 Claims

ABSTRACT OF THE DISCLOSURE

An improved method for producing interferon which comprises incubating the tissue or cell material from which interferon is produced with a proteolytic enzyme after the first harvest of interferon has been removed therefrom. The tissue or cell material is then washed free of said proteolytic enzyme and reincubated with fresh culture medium to yield a second harvest of interferon.

---

The present invention relates to an improved method for the production of interferon. More particularly, the invention relates to an improvement which results in substantially higher total yields of interferon than heretofore obtainable.

Interferon is a biological substance which is produced by host cells in response to a virus infection. The interferon thus produced is a viral inhibiting substance which acts presumably by inhibiting intracellular replication of virus with no direct inactivating effect on the virus itself.

In general, interferon is produced by incubating infective virus or virus partially or completely inactivated by heat or ultraviolet irradiation in living animal tissue or cell material suspended in an aqueous culture medium and thereafter separating the interferon-bearing aqueous medium from the tissue or cell material. A second harvest of production can be obtained from the tissue or cell material by re-incubating same with fresh culture medium. It has been found, however, that the yields of interferon of said second harvest are substantially lower than those obtained in the first harvest.

It is an object of the invention to provide an improved method for producing interferon. It is a further object of the invention to provide a method whereby substantially higher total yields of interferon are obtainable from a tissue or cell material. These and other objects of the present invention will become apparent to one skilled in the art in the light of the instant specification.

In its broad aspect, the invention relates to an improvement in the in vitro method of producing interferon, said improvement comprising the steps of incubating the tissue or cell material after the first harvest of interferon product has been removed therefrom with a proteolytic enzyme, washing said tissue or cell material free of said enzyme, and reincubating said tissue or cell material with fresh culture medium. It has been unexpectedly found that the step of incubating the tissue or cell material with a proteolytic enzyme increases the yield of interferon in the second harvest. This is particularly surprising since it is known that proteolytic enzymes, such as trypsin, pepsin and chymotrypsin, destroy the biological activity of interferon.

The enzymes operable in the practice of the invention belong to the class of "proteolytic enzymes." Said enzymes are capable of breaking down proteins and include, for example, pepsin, trypsin, papain, chymotrypsin, chymytrypsinogen, proteinase, enterokinase, pectinase, pepsinogen, ficin, bromelains, and the like.

A general method of producing interferon comprises growing a monolayer of tissue cells on a sterile, nontoxic surface, i.e., Pyrex brand glass bottle, and removing the nutrient medium after a complete cell monolayer has grown. The cell monolayer is infected with the inducer, i.e., infective virus or virus partially or completely inactivated, and fresh tissue culture medium is added thereto. After approximately 24 hours of incubation at about 37° C., the liquid medium is removed from the tissue cells and maintained at a temperature of about 65° C. for a period of 30 minutes to inactivate virus therein. This constitutes the first harvest of crude interferon.

To the tissue cell monolayer there is added fresh tissue culture medium and, after another 24 hours of incubation at about 37° C., a second harvest of crude interferon is obtained by removal of the tissue culture medium.

As indicated hereinabove, the amount of interferon obtained in the second harvest is substantially less than that in the first harvest if the conventional general procedure outlined above is used.

In carrying out the improvement of the present invention, the tissue cell monolayers, after removal therefrom of the first harvest of interferon, are incubated in the presence of a proteolytic enzyme. Said tissue cell monolayers are then washed free of said enzyme and treated as indicated above to produce a second harvest of interferon, which has been found to be substantially higher than obtainable in the absence of the enzyme treatment.

The conditions under which the tissue cell cultures are incubated in the presence of a proteolytic enzyme are not narrowly critical. Preferably, the tissue cell cultures are incubated for a period of about 1 hour, and at a temperature of about 37° C. The proteolytic enzyme is employed as a solution in tissue culture medium, said solution having a preferred concentration of about 0.01–1.0 mg. of enzyme per ml. of solution, depending upon the enzyme employed.

While all proteolytic enzymes set forth hereinabove are operable in the practice of the present invention, the preferred enzymes are papain and trypsin.

The following example is illustrative of the present invention.

Chicken interferon was produced by growing monolayers of chick embryo fibroblasts on sterile, non-toxic Pyrex brand glass bottles. The nutrient medium was removed after complete monolayers had grown, the monolayers were infected with Chikungunya virus and fresh culture tissue medium was added thereto.

After 24 hours of incubation at a temperature of 37° C., the medium was removed and the monolayers were incubated with a solution of trypsin in fresh tissue culture medium (0.01 mg./ml.) for one hour at a temperature of 37° C. The tissue monolayers were then washed free of trypsin and fresh tissue culture medium was added thereto. After incubation for 24 hours at 37° C., the second harvest of crude interferon was collected and assayed as indicated hereinafter.

Under the same conditions set forth above, with the exception that the tissue cell monolayers were not treated with trypsin according to the novel improvement of the present invention, chicken interferon was similarly produced and the second harvest of interferon was also assayed as indicated below.

Interferon activity is assayed using chick embryo fibroblast monolayers infected with known plaque-forming units of Sindbis virus and protected by various dilutions of the interferon preparation under assay.

Chick embryo fibroblast monolayers are grown as illustrated above and are then treated for 24 hours with various dilutions of crude interferon. At the end of this time, the culture medium is removed and the cultures are infected with a suspension of Sindbis virus, all cultures, except the cell control, receiving the same amount. The virus is allowed one hour for adsorption and then the cell sheet is overlaid with methyl cellulose (100 cps. grade), 1.5% in medium.

After incubation for 48 hours, the cultures are stained with crystal violet and the plaques (clear areas) formed by the Sindbis virus are counted.

Two control systems are processed simultaneously with the test cultures, one consisting of uninfected cell monolayers (cell control), the other of infected cell monolayers unprotected by interferon (virus control).

The number of plaques produced in the virus control system represents the plaque-forming units used for infecting the cultures. A 50% reduction in the number of plaques is calculated to give the titer of interferon in a particular preparation being assayed.

Table I, which follows, sets forth the assay results, showing that, even at a dilution of $\frac{1}{500}$, the content of interferon in liquid of the second harvest obtained by the improved method of the invention, is sufficiently high to completely inhibit virus growth whereas, at the same dilution, the second harvest obtained by conventional methods loses some of its potency, showing that the interferon content thereof is substantially lower.

The results of Table II, obtained from the assay of interferon solutions prepared by a method substantially similar to that hereinbefore described, further proves such contention. It is noted that, at a concentration of $\frac{1}{600}$, the interferon fraction of the invention inhibits the formation of plaques to a very high extent whereas the prior art fraction, at the same concentration, has only about $\frac{1}{3}$ of its inhibiting effectiveness.

TABLE I

|  | Dilution | No. of plaques (average) | Percent inhibition |
|---|---|---|---|
| Cell control | | 0 | 100 |
| Virus control | | 244 | 0 |
| Test solutions (with trypsin treatment) | 1/100 | 0 | 100 |
| | 1/200 | 0 | 100 |
| | 1/300 | 0 | 100 |
| | 1/400 | 0 | 100 |
| | 1/500 | 0 | 100 |
| Test solution (without trypsin treatment) | 1/100 | 0 | 100 |
| | 1/200 | 0 | 100 |
| | 1/300 | 0 | 100 |
| | 1/400 | 55 | 77.5 |
| | 1/500 | 65 | 73.4 |

TABLE II

|  | Dilution | No. of plaques (average) | Percent inhibition |
|---|---|---|---|
| Cell control | | 0 | 100 |
| Virus control | | 197 | 0 |
| Test solutions (with trypsin treatment) | 1/30 | 0 | 100 |
| | 1/100 | 0 | 100 |
| | 1/300 | 18 | 90.8 |
| | 1/600 | 28 | 850. |
| Test solutions (without trypsin treatment) | 1/30 | 0 | 800 |
| | 1/100 | 0 | 110 |
| | 1/300 | 22 | 88.0 |
| | 1/600 | 137 | 30.5 |

When papain is substituted for trypsin in the above examples, substantially similar results are obtained.

Although the invention has been illustrated in the above examples, the invention is not to be construed as limited thereto but rather the invention encompasses the generic area as hereinbefore disclosed. Various modifications and embodiments of this invention can be made without departing from the spirit and scope thereof.

What is claimed is:

1. In a method of producing Interferon by incubating a cell material with a virus inducer in a culture medium, the improvement comprising the steps of incubating said material with a proteolytic enzyme after the first harvest of interferon product has been removed therefrom; washing said material free of said enzyme; reincubating said material with fresh culture medium; and separating therefrom a second harvest of interferon.

2. The method of claim 1 wherein the proteolytic enzyme is papain.

3. The method of claim 1 wherein the proteolytic enzyme is trypsin.

4. In a method of producing interferon by incubating a cell material with a virus inducer in a culture medium, the improvement comprising incubating said material with a solution of proteolytic enzyme in culture medium after the first harvest of interferon has been removed therefrom, said solution having a concentration of about 0.10 to 1.0 mg. of enzyme per ml. of solution; washing said material free of said enzyme; reincubating said material with fresh culture medium; and separating therefrom a second harvest of interferon.

5. The method of claim 4 wherein the proteolytic enzyme is papain.

6. The method of claim 4 wherein the proteolytic enzyme is trypsin.

7. The method of claim 1 wherein the proteolytic enzyme is pepsin.

8. The method of claim 1 wherein the proteolytic enzyme is pectinase.

9. The method of claim 1 wherein the proteolytic enzyme is proteinase.

10. The method of claim 4 wherein the proteolytic enzyme is pepsin.

11. The method of claim 4 wherein the proteolytic enzyme is pectinase.

12. The method of claim 4 wherein the proteolytic enzyme is proteinase.

References Cited

Isaacs et al.: Brit. Med. Bull., vol. 15, No. 3, pp. 185–188, September 1959.

Lindenmann et al.: Brit. J. Exptl. Pathol., vol. 38, pp. 551–562, 1957.

RICHARD L. HUFF, Primary Examiner